(12) United States Patent
Satran et al.

(10) Patent No.: US 8,905,683 B2
(45) Date of Patent: Dec. 9, 2014

(54) CUTTING TOOL AND CUTTING INSERT HAVING CLAMPING BORE WITH SPACED APART CLAMPING PORTIONS THEREFOR

(75) Inventors: Amir Satran, Kfar Vradim (IL); Evgeny Tulchinsky, Kiryat Yam (IL)

(73) Assignee: Iscar, Ltd., Tefen (IL)

( * ) Notice: Subject to any disclaimer, the term of this patent is extended or adjusted under 35 U.S.C. 154(b) by 474 days.

(21) Appl. No.: 13/465,215

(22) Filed: May 7, 2012

(65) Prior Publication Data

US 2013/0051938 A1 Feb. 28, 2013

(30) Foreign Application Priority Data

Aug. 22, 2011 (IL) .......................................... 214781

(51) Int. Cl.
*B23C 5/22* (2006.01)
*B23C 5/08* (2006.01)
*B23C 5/06* (2006.01)

(52) U.S. Cl.
CPC ................. *B23C 5/2221* (2013.01); *B23C 5/08* (2013.01); *B23C 5/06* (2013.01); *B23C 2200/361* (2013.01); *B23C 2200/085* (2013.01); *B23C 2200/286* (2013.01); *B23C 2210/168* (2013.01)
USPC ............................................ 407/48; 407/113

(58) Field of Classification Search
USPC ....................... 407/48, 42, 113, 40, 103, 104
See application file for complete search history.

(56) References Cited

U.S. PATENT DOCUMENTS

| 3,913,197 | A | * | 10/1975 | Wolf ................................ 407/47 |
| 4,729,697 | A | * | 3/1988 | Lacey .............................. 407/42 |
| 5,199,828 | A | * | 4/1993 | Forsberg et al. ............... 407/104 |
| 5,542,793 | A |   | 8/1996 | Deiss et al. |
| 5,685,670 | A |   | 11/1997 | Satran |
| 7,604,441 | B2 | * | 10/2009 | Bhagath ......................... 407/113 |
| 7,785,045 | B2 | * | 8/2010 | Viol ............................... 407/101 |
| 8,408,847 | B2 | * | 4/2013 | Rysavy .......................... 407/104 |
| 2007/0286692 | A1 |   | 12/2007 | Rysavy |
| 2008/0193233 | A1 |   | 8/2008 | Park |
| 2008/0240873 | A1 | * | 10/2008 | Furuki .......................... 407/107 |
| 2009/0196701 | A1 |   | 8/2009 | Wihlborg et al. |
| 2012/0087747 | A1 |   | 4/2012 | Fang et al. |

FOREIGN PATENT DOCUMENTS

| EP | 0599393 A1 | 6/1994 |
| JP | 2010-253632 A | 11/2010 |

OTHER PUBLICATIONS

International Search Report dated Oct. 23, 2012 issued in PCT counterpart application (No. PCT/IL2012/050273).

* cited by examiner

*Primary Examiner* — Daniel Howell
*Assistant Examiner* — Nicole N Ramos
(74) *Attorney, Agent, or Firm* — Womble Carlyle (57) ABSTRACT

A cutting tool has a cutting insert removably secured to a tool body by a fastening member. The cutting insert includes a clamping bore having at least two upper and at least two lower clamping portions intersecting a first and a second horizontal plane, respectively, the first and second horizontal planes being perpendicular to a central axis and spaced apart from each other, and the clamping bore being non-circular at cross-sections taken in the first and second horizontal planes. Upper and lower imaginary lines tangential to the at least two upper and the at least two lower clamping portions, respectively, form zero or acute first and second clamping angles with the central axis, the first and second clamping angles being different. Exactly two upper and exactly two lower clamping portions are in simultaneous clamping contact with an equal number of corresponding clamping zones on the fastening member.

38 Claims, 10 Drawing Sheets

CUTTING TOOL AND CUTTING INSERT HAVING CLAMPING BORE WITH SPACED APART CLAMPING PORTIONS THEREFOR

FIELD OF THE INVENTION

The present invention relates to a rotary cutting tool and a removably securable cutting insert, for use in metal cutting processes in general, and for milling operations in particular.

BACKGROUND OF THE INVENTION

Within the field of metal cutting tools used in milling operations, cutting inserts removably securable in a cutting body have long since provided a suitably hard material, i.e. cemented carbide, in the vicinity of the cutting edge, where the cutting body, manufactured from a less hard material, is reusable following the disposal of a worn or damaged cutting insert.

Many cutting inserts of this type are seated in insert receiving pockets of the cutting body which provide support for the cutting inserts in both axial and radial directions, e.g. slot milling and face milling operations, although in some applications, e.g. extended flute mills and porcupine cutters, the cutting body may not support the cutting inserts in an axial direction.

US 2007/0286692 discloses a milling tool comprising a toolholder having a plurality of insert receiving pockets, each insert receiving pocket housing an indexable cutting insert removably secured by means of a clamping screw.

Each of the insert receiving pockets includes a seat surface having a threaded hole for receiving the clamping screw, and a side abutment surface having axially and radially facing abutment portions for supporting the cutting insert in both axial and radial directions.

Each cutting insert has a clamping hole including a clamping surface defining at least part of a non-circular, substantially elliptical cone, and each clamping screw, extending through the clamping hole, includes a substantially cone shaped clamping head contacting the clamping surface at two contact points.

The resultant clamping force applied at the two contact points is directed towards both the radial and axial facing abutment portions.

U.S. Pat. No. 5,542,793 discloses a spiral-toothed milling head comprising a tool body having four spiral clamping grooves, each spiral clamping groove fitted with a plurality of square or parallelogram-shaped indexable cutting inserts overlapping in an axial direction.

Each cutting insert is removably secured to its respective spiral clamping groove by means of a clamping screw, the cutting insert being seated on an insert reception seat having a radially facing abutment surface but no axially facing abutment surface.

Each cutting insert has an essentially cylindrical bore therethrough with a slightly convexly bowed conical end portion, and each clamping screw includes an essentially conical shaped clamping head and a precisely formed cylindrical portion extending through the cylindrical bore.

The essentially conical shaped clamping head engages the slightly convexly bowed conical end portion, and the precisely formed cylindrical portion fits into a cylindrical, accurately positioned matching fitting bore in the insert reception seat, whereby the axis of the cylindrical bore is offset from the axis of the fitting bore. The clamping screw, itself, provides support for its respective cutting insert in the axial direction.

SUMMARY OF THE INVENTION

In accordance with the present invention, there is provided a cutting tool comprising a tool body with at least one seating surface, at least one cutting insert, and at least one fastening member for removably securing the at least one cutting insert to the at least one seating surface, the at least one cutting insert having opposing top and bottom surfaces with a peripheral side surface and a central axis extending therebetween, and a clamping bore in the top surface, the peripheral side surface including at least one flank surface, where at least one cutting edge is formed at the intersection of the at least one flank surface with at least the top surface, and the clamping bore including at least two upper clamping portions intersecting a first horizontal plane and at least two lower clamping portions intersecting a second horizontal plane, each of the clamping portions representing a distinct region of the clamping bore, and the first and second horizontal planes being perpendicular to the central axis and spaced apart from each other, wherein upper imaginary lines tangential to the at least two upper clamping portions and coplanar with the central axis, form zero or acute first clamping angles with the central axis, and lower imaginary lines tangential to the at least two lower clamping portions and coplanar with the central axis, form zero or acute second clamping angles with the central axis, wherein the first and second clamping angles are different, and wherein exactly two upper clamping portions and exactly two lower clamping portions, representing four operative clamping portions, are in simultaneous clamping contact with an equal number of corresponding clamping zones on the fastening member.

Also in accordance with the present invention, there is provided a cutting insert having opposing top and bottom surfaces with a peripheral side surface and a central axis extending therebetween, and a clamping bore in the top surface, the peripheral side surface including at least one flank surface, and at least one cutting edge formed at the intersection of the at least one flank surface with at least the top surface, and the clamping bore including at least two upper clamping portions intersecting a first horizontal plane, and at least two lower clamping portions intersecting a second horizontal plane, each of the clamping portions representing a distinct region of the clamping bore, and the first and second horizontal planes being perpendicular to the central axis and spaced apart from each other, wherein upper imaginary lines tangential to the at least two upper clamping portions and coplanar with the central axis, form zero or acute first clamping angles with the central axis, and lower imaginary lines tangential to the at least two lower clamping portions and coplanar with the central axis, form zero or acute second clamping angles with the central axis, wherein the first and second clamping angles are different, wherein the clamping bore extends towards and opens out at the bottom surface, and is non-circular at cross-sections taken in the first and second horizontal planes, and wherein the upper and lower imaginary lines extend in a direction above the top surface without intersecting the central axis.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

The present invention relates to a cutting tool 20, 120 comprising a tool body 22 with at least one seating surface 24, at least one cutting insert 26, 126, and at least one fastening member 28 for removably securing the at least one cutting insert 26, 126 to the at least one seating surface 24.

In some embodiments of the present invention, as shown in FIGS. 1, 2, 12 and 13, the cutting tool 20, 120 may be in the form of a rotary cutting tool, comprising a tool body 22 with a plurality of seating surfaces 24 adjacent a forward facing end surface 30 and an equal number of cutting inserts 26, 126, each cutting insert 26, 126 removably secured to its respective seating surface 24 by its respective fastening member 28.

In other embodiments of the present invention (not shown), the cutting tool may be in the form of a rotary cutting tool, comprising a tool body with a plurality of axially extending or helical flutes, each flute having several seating surfaces and an equal number of cutting inserts, each cutting insert removably secured to its respective seating surface by its respective fastening member.

In some embodiments of the present invention, the tool body 22 may be manufactured from machined steel, and the cutting insert 26, 126 may preferably be manufactured by form pressing and sintering a cemented carbide, such as tungsten carbide, and may be coated or uncoated.

According to the present invention, as shown in FIGS. 3, 4, 14 and 15, the cutting insert 26, 126 has opposing top and bottom surfaces 32, 34 with a peripheral side surface 36 and a central axis A1 extending therebetween, and a clamping bore 38 in the top surface 32. The peripheral side surface 36 includes at least one flank surface 40, and at least one cutting edge 42 is formed at the intersection of the at least one flank surface 40 with at least the top surface 32.

Also, according to the present invention, the clamping bore 38 may be coaxial with the central axis A1, extending towards and opening out at the bottom surface 34.

Figure 1:
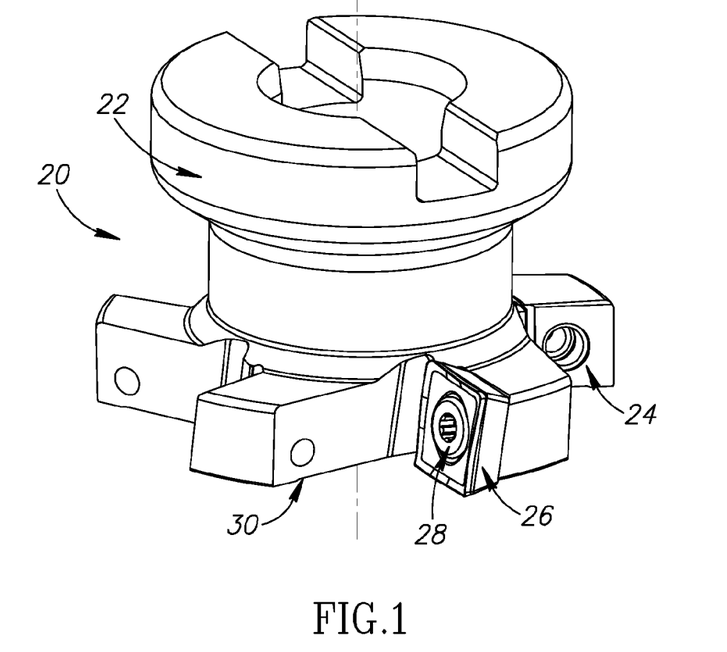
FIG. 1 is a perspective view of a cutting tool in accordance with a first embodiment of the present invention.
Figure 2:
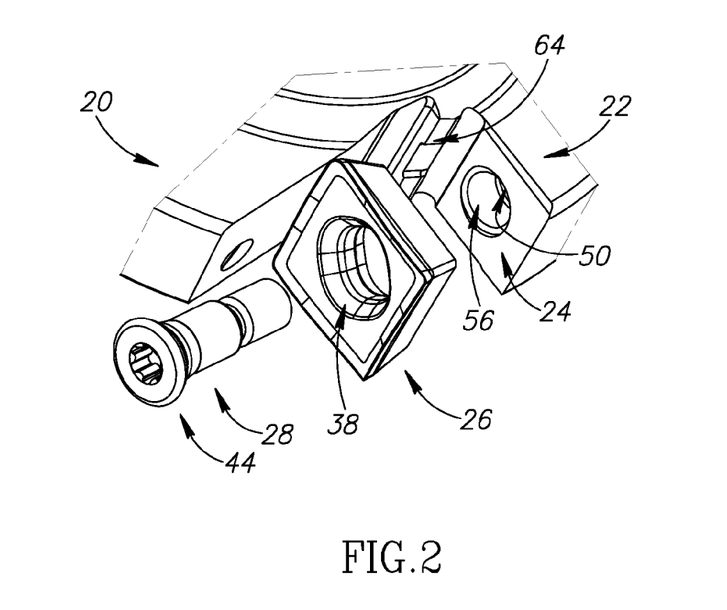
FIG. 2 is an exploded partial view of the cutting tool shown in FIG. 1.
Figure 3:
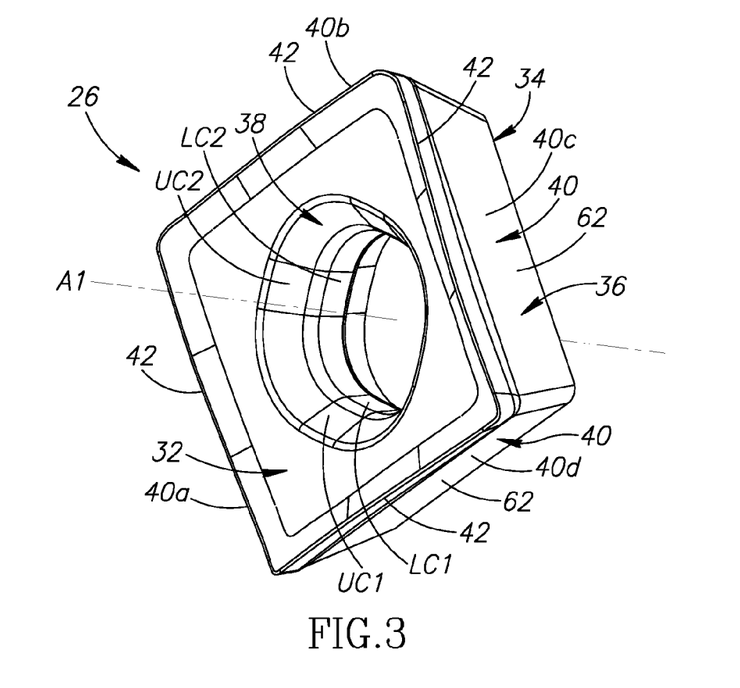
FIG. 3 is a perspective view of the cutting insert in accordance with the first embodiment of the present invention.
Figure 4:
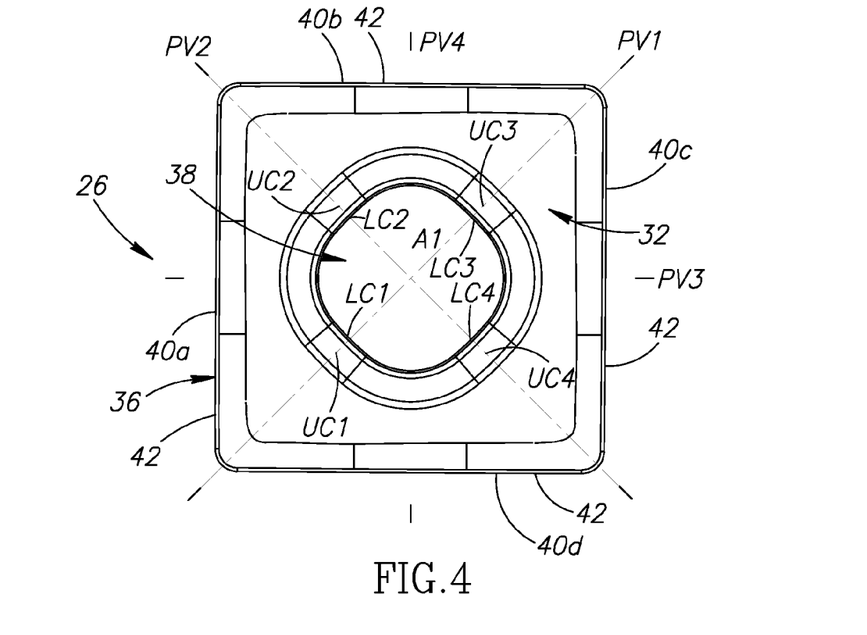
FIG. 4 is a top view of the cutting insert shown in FIG. 3.

In a first embodiment of the present invention, as shown in FIGS. 3 and 4, the peripheral side surface 36 may include four flank surfaces 40 and four cutting edges 42, each cutting edge 42 formed at the intersection of one of the four flank surfaces 40 and the top surface 32. The four flank surfaces 40 may be identical and the four cutting edges 42 may be identical, and the cutting insert 26 may be indexable about its central axis A1. However, cutting insert 26 is single-sided, i.e., is not reversible.

Figure 14:
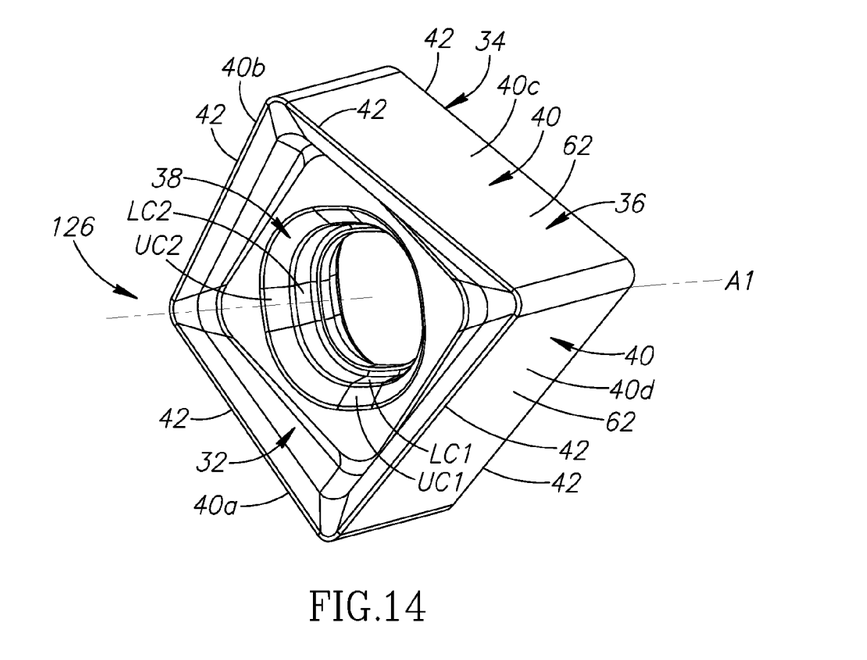
FIG. 14 is a perspective view of the cutting insert in accordance with the second embodiment of the present invention.
Figure 15:
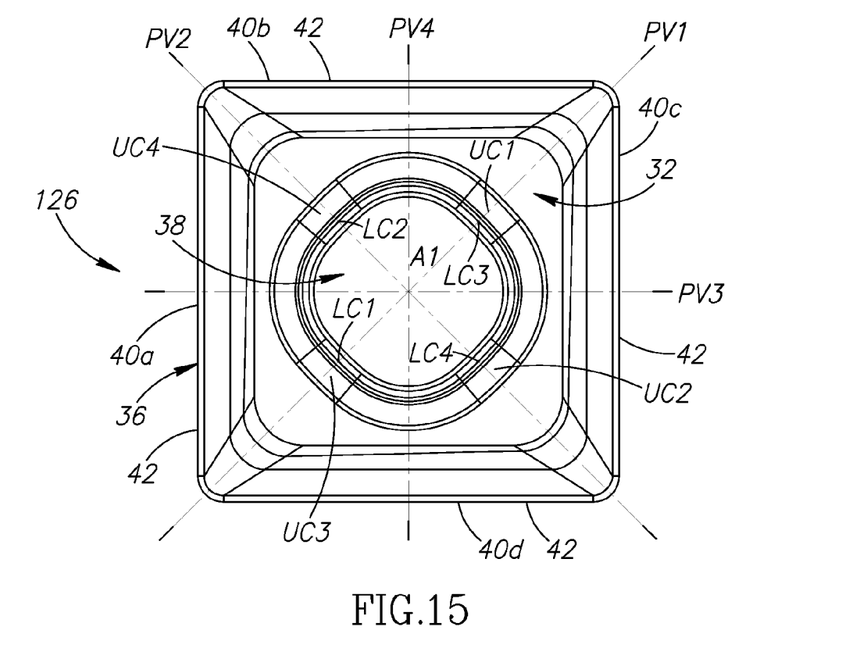
FIG. 15 is a top view of the cutting insert shown in FIG. 14.

In a second embodiment of the present invention, as shown in FIGS. 14 and 15, the peripheral side surface 36 may include four flank surfaces 40 and eight cutting edges 42, four cutting edges 42 formed at the intersection of the four flank surfaces 40 and the top surface 32, and four cutting edges 42 formed at the intersection of the four flank surfaces 40 and the bottom surface 34. The four flank surfaces 40 may be identical and the eight cutting edges 42 may be identical, and the double-sided (reversible) cutting insert 126 may be indexable about its central axis A1.

In other embodiments of the present invention (not shown), the cutting insert may be indexable, having six or eight cutting edges formed at the intersection of six or eight flank surfaces, respectively, and the top surface.

Figure 8:
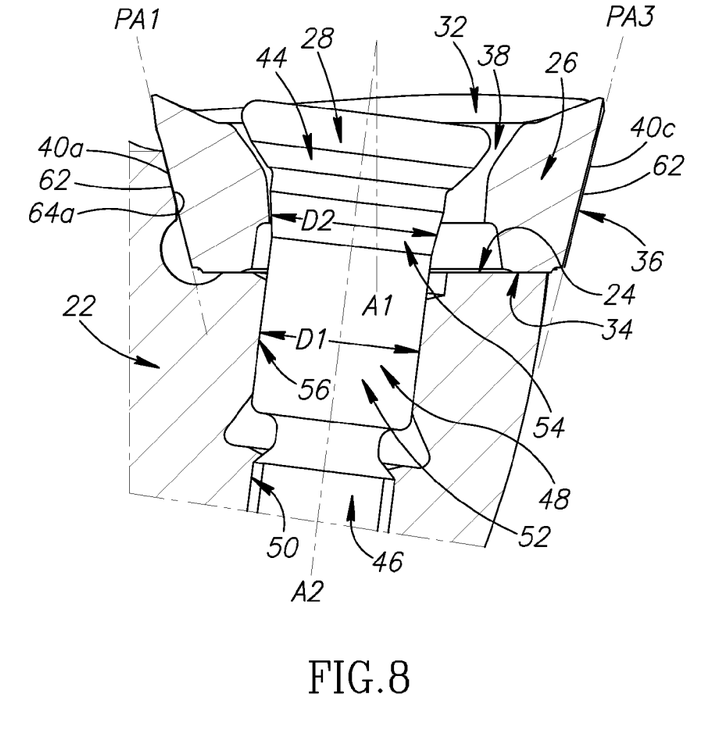
FIG. 8 is a cross-sectional view of the cutting tool shown in FIG. 5 taken along the line VIII-VIII.
Figure 9:
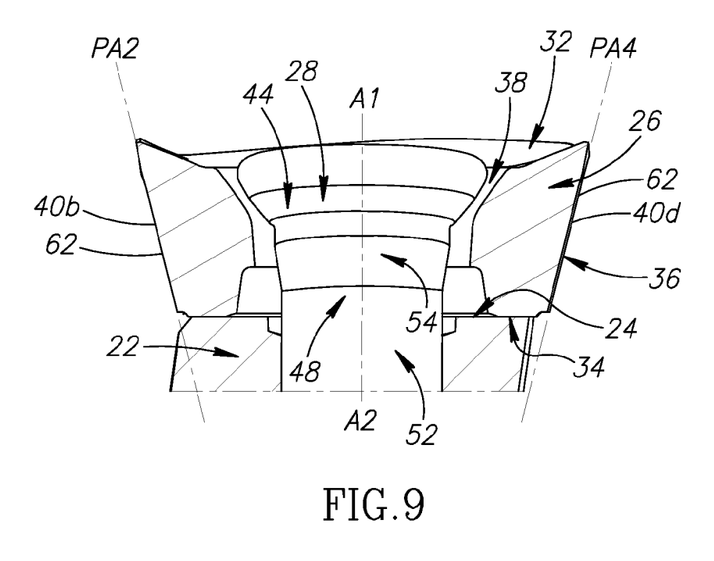
FIG. 9 is a cross-sectional view of the cutting tool shown in FIG. 5 taken along the line IX-IX.
Figure 10:
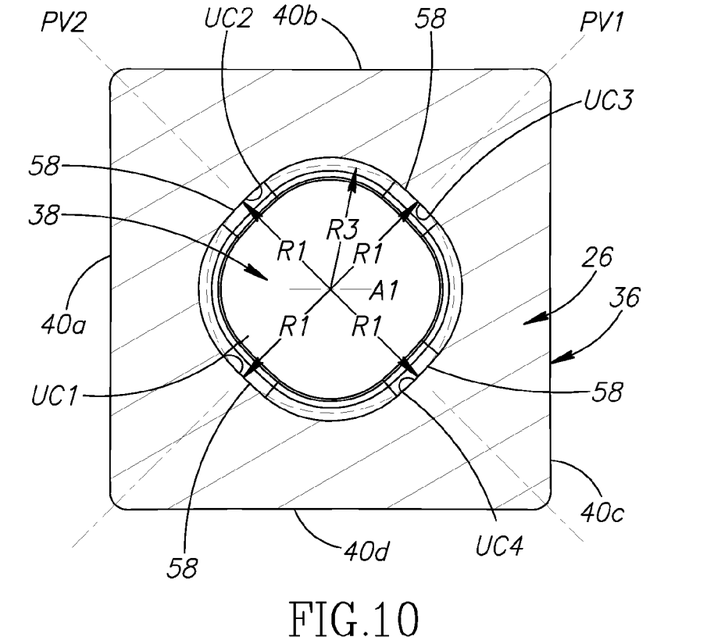
FIG. 10 is a horizontal cross-sectional view of the cutting insert shown in FIG. 4 taken along the line X-X seen in FIGS. 6 and 7 and showing the cross-section at plane PH1.
Figure 11:
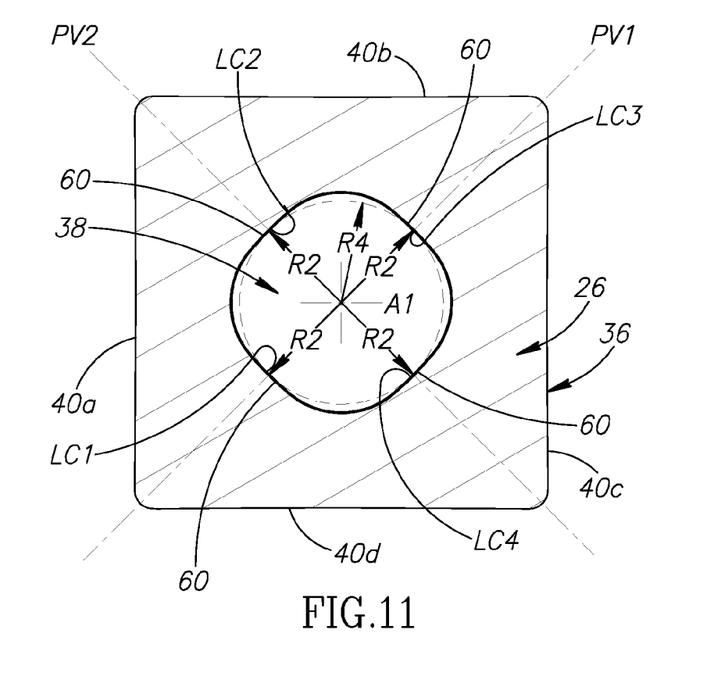
FIG. 11 is a horizontal cross-sectional view of the cutting insert shown in FIG. 4 taken along the line XI-XI seen in FIGS. 6 and 7 and showing the cross-section at plane PH2.
Figure 12:
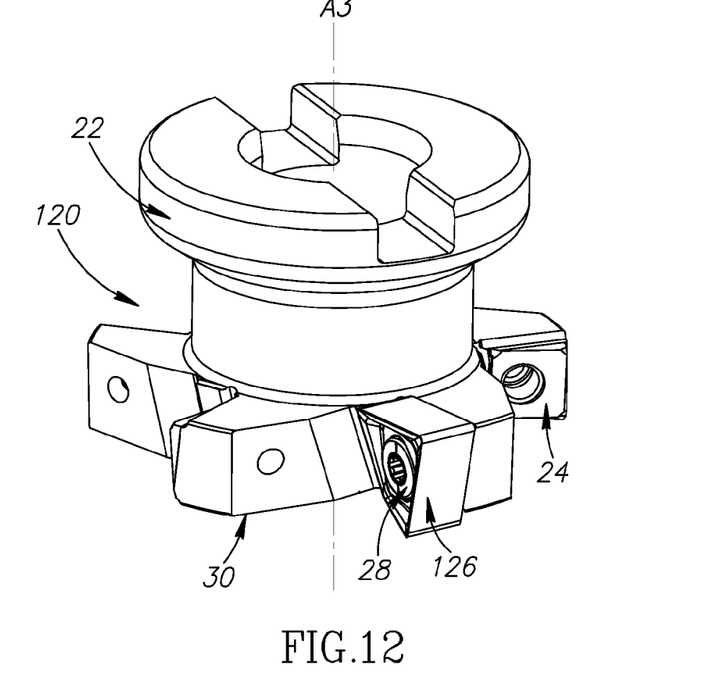
FIG. 12 is a perspective view of a cutting tool in accordance with a second embodiment of the present invention.
Figure 13:
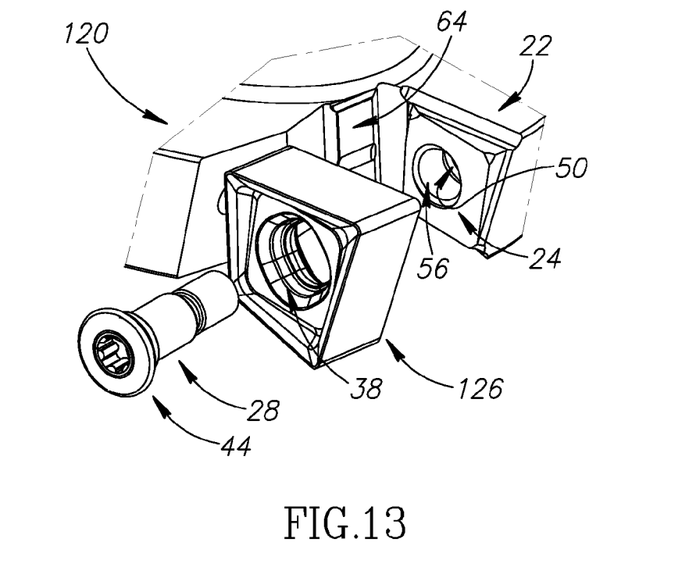
FIG. 13 is an exploded partial view of the cutting tool shown in FIG. 12.

In the first embodiment of the present invention, as shown in FIGS. 8 and 9, the cutting insert 26 may be described as 'positive', with the four flank surfaces 40 inclined inwardly in a direction away from the top surface 32.

Figure 19:
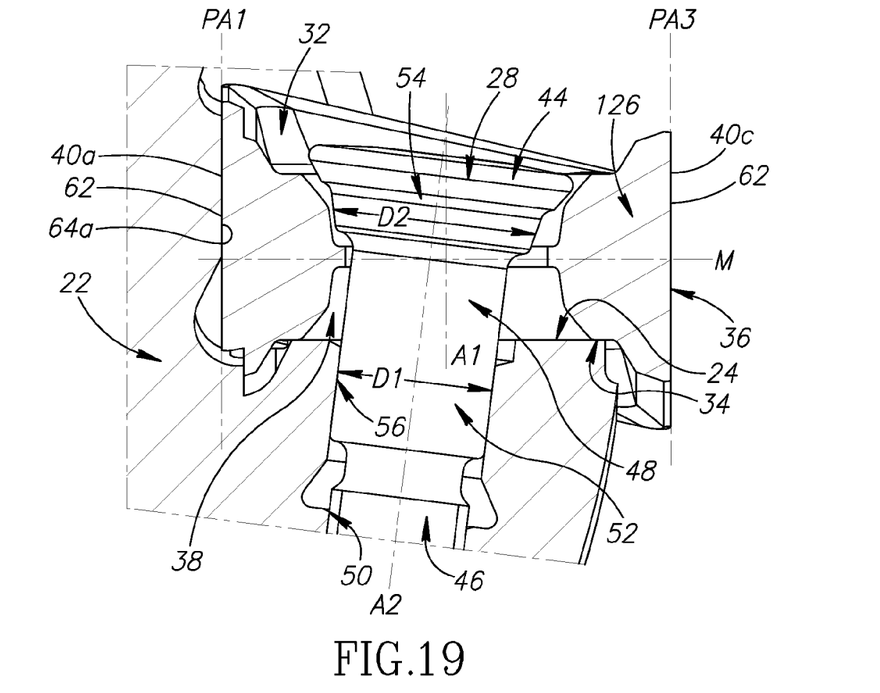
FIG. 19 is a cross-sectional view of the cutting tool shown in FIG. 16 taken along the line XIX-XIX.
Figure 20:
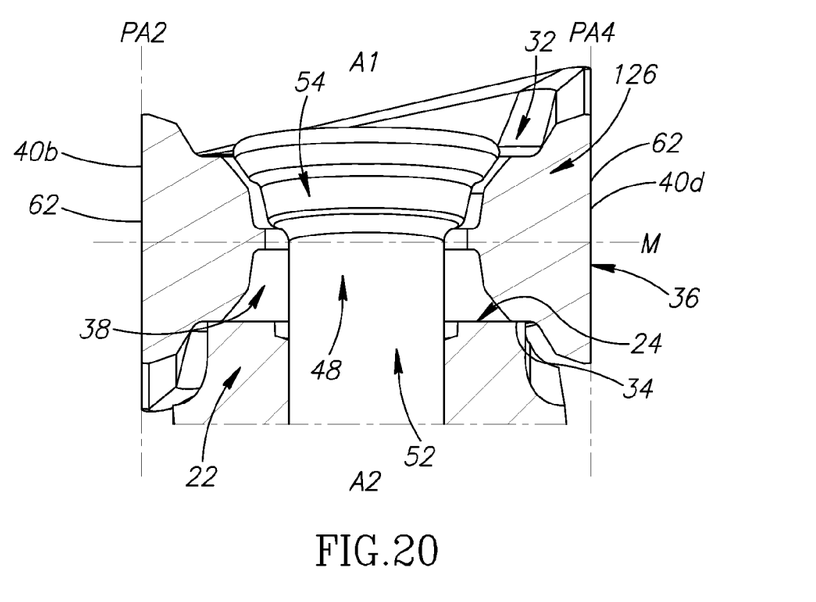
FIG. 20 is a cross-sectional view of the cutting tool shown in FIG. 16 taken along the line XX-XX.
Figure 21:
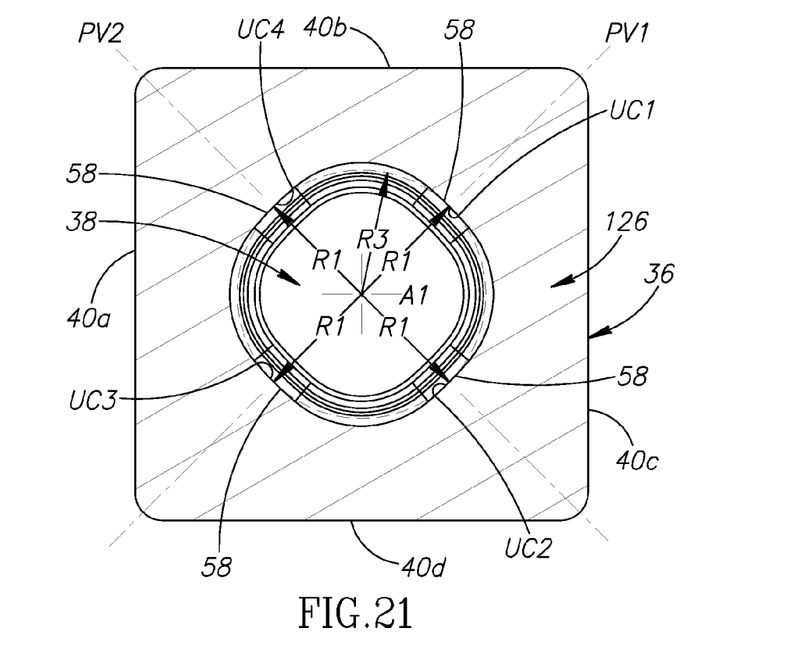
FIG. 21 is a horizontal cross-sectional view of the cutting insert shown in FIG. 15 taken along the line XXI-XXI seen in FIGS. 17 and 18 and showing the cross-section at plane PH1.
Figure 22:
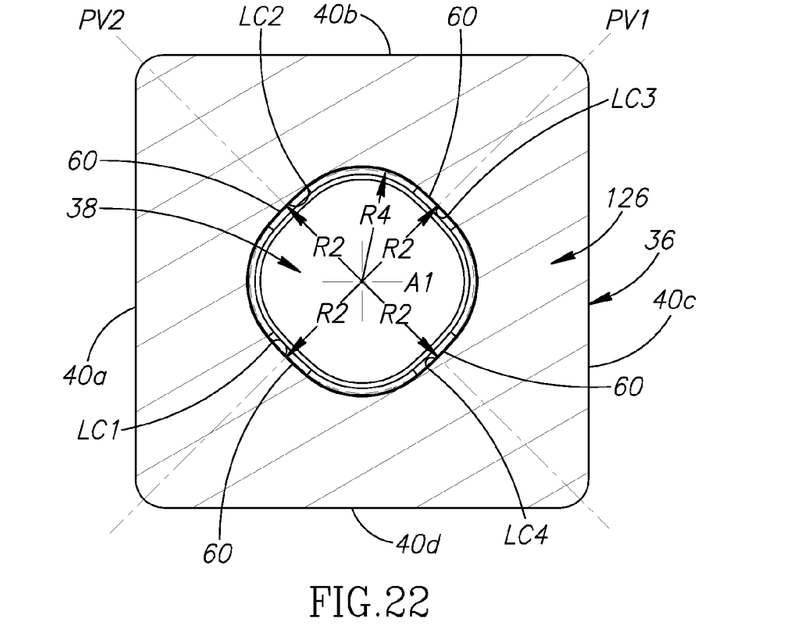
FIG. 22 is a horizontal cross-sectional view of the cutting insert shown in FIG. 15 taken along the line XXII-XXII seen in FIGS. 17 and 18 and showing the cross-section at plane PH2.

In the second embodiment of the present invention, as shown in FIGS. 19 and 20, the cutting insert 126 may be described as 'double negative', with the four flank surfaces 40 generally perpendicular to both the top and bottom surfaces 32, 34.

In other embodiments of the present invention (not shown), the cutting insert may be described as 'negative', with the flank surfaces inclined outwardly in a direction away from the top surface.

According to the present invention, the clamping bore 38 includes at least two upper clamping portions UC1, UC2 intersecting a first horizontal plane PH1, and at least two lower clamping portions LC1, LC2 intersecting a second horizontal plane PH2.

Figure 6:
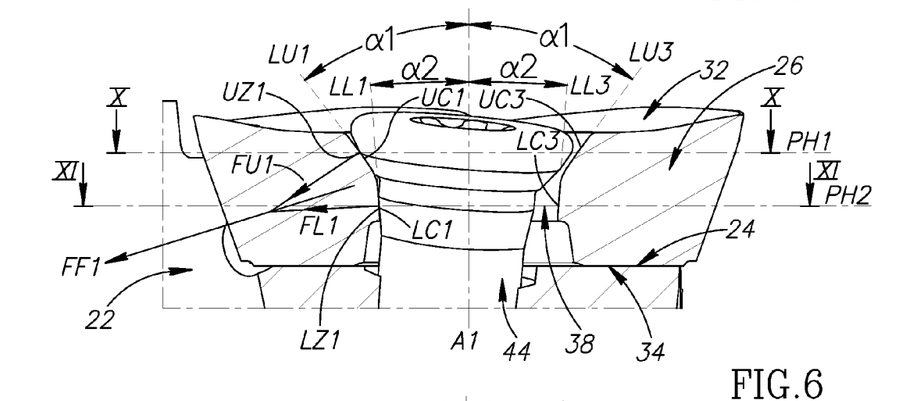
FIG. 6 is a cross-sectional view of the cutting tool shown in FIG. 5 taken along the line VI-VI.
Figure 7:
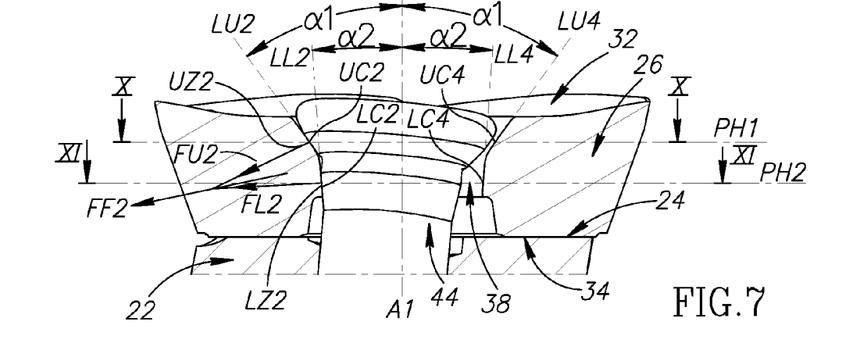
FIG. 7 is a cross-sectional view of the cutting tool shown in FIG. 5 taken along the line VIII-VIII.

In the first embodiment of the present invention, as shown in FIGS. 4, 6 and 7, the clamping bore 38 may include a total of eight clamping portions UC1, UC2, UC3, UC4, LC1, LC2, LC3, LC4, each said clamping portion representing a distinct region of the clamping bore 38. The eight clamping portions UC1, UC2, UC3, UC4, LC1, LC2, LC3, LC4 include four upper clamping portions UC1, UC2, UC3, UC4 intersecting the first horizontal plane PH1 and four lower clamping portions LC1, LC2, LC3, LC4 intersecting the second horizontal plane PH2.

Figure 17:
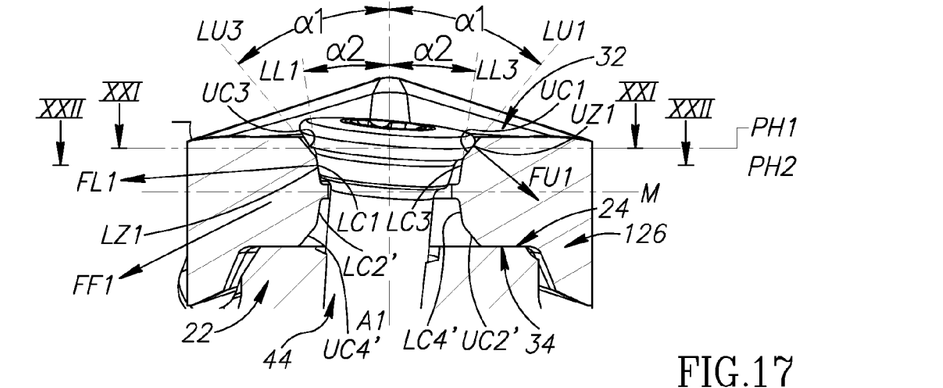
FIG. 17 is a cross-sectional view of the cutting tool shown in FIG. 16 taken along the line XVII-XVII.
Figure 18:
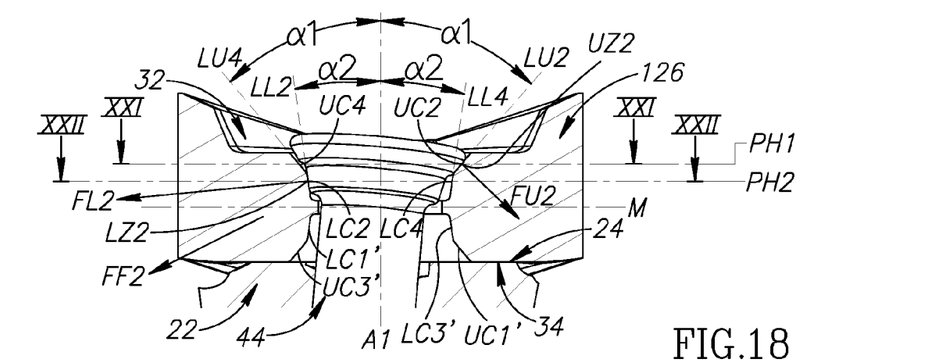
FIG. 18 is a cross-sectional view of the cutting tool shown in FIG. 16 taken along the line XVIII-XVIII.

In the second embodiment of the present invention, as shown in FIGS. 15, 17 and 18, the clamping bore 38, may exhibit mirror symmetry about a median plane M perpendicular to the central axis A1 and include a total of sixteen clamping portions, eight clamping portions UC1, UC2, UC3, UC4, LC1, LC2, LC3, LC4 between the median plane M and the top surface 32 and eight clamping portions UC1', UC2', UC3', UC4', LC1', LC2', LC3', LC4' between the median plane M and the bottom surface 34. The eight clamping portions UC1, UC2, UC3, UC4, LC1, LC2, LC3, LC4 between the median plane M and the top surface 32 include four upper clamping portions UC1, UC2, UC3, UC4 intersecting the first horizontal plane PH1 and four lower clamping portions LC1, LC2, LC3, LC4 intersecting the second horizontal plane PH2.

According to the present invention, as shown in FIGS. 6, 7, 17 and 18, the first and second horizontal planes PH1, PH2 both are perpendicular to the central axis A1 and thus parallel to one another, and spaced apart from each other.

In some embodiments of the present invention, the first and second horizontal planes PH1, PH2 may bisect the upper UC1, UC2, UC3, UC4 and lower LC1, LC2, LC3, LC4 clamping portions, respectively, and the first horizontal plane PH1 may be closer to the top surface 32 than the second horizontal plane PH2, such that the upper clamping portions UC1, UC2, UC3, UC4 may always be considered closer to the top surface 32 than the lower clamping portions LC1, LC2, LC3, LC4.

According to the present invention, as shown in FIGS. 6, 7, 17 and 18, exactly two upper clamping portions UC1, UC2 and exactly two lower clamping portions LC1, LC2, representing four operative clamping portions UC1, UC2, LC1, LC2, are in simultaneous clamping contact with an equal number of corresponding clamping zones UZ1, UZ2, LZ1, LZ2 on the fastening member 28.

According to the present invention, as shown in FIGS. 10, 11, 21 and 22, the clamping bore 38 may be non-circular at cross-sections taken in the first and second horizontal planes PH1, PH2.

Also, in some embodiments of the present invention, as shown in FIGS. 8 and 19, the fastening member 28 may be in the form of a rigid clamping screw 44 with a screw axis A2, having a threaded portion 46 and a non-threaded portion 48.

In other embodiments of the present invention (not shown), the fastening member may be in the form of a clamping arm or lever.

The threaded portion 46 may engage a threaded bore 50 in its associated seating surface 24 and the screw axis A2 may be inclined with respect to the central axis A1.

The non-threaded portion 48 may be circular at any cross-section taken in a plane perpendicular to the screw axis A2, having a first screw sub-portion 52 with a constant first diameter D1 and a second screw sub-portion 54 with a second diameter D2 which may increase in direction away from the threaded portion 46.

The cylindrical first screw sub-portion 52 may have a very accurate first diameter D1 to precisely fit into a seating hole 56 coaxial with the threaded bore 50, and the second screw sub-portion 54, which could be described as the screw head, may include the four clamping zones UZ1, UZ2, LZ1, LZ2 which make clamping contact with the four operative clamping portions UC1, UC2, LC1, LC2.

In some embodiments of the present invention, as shown in FIGS. 10, 11, 21 and 22, each of the upper UC1, UC2, UC3, UC4 and each of the lower LC1, LC2, LC3, LC4 clamping portions may appear as single segments of separate upper and lower curved lines 58, 60 at cross-sections taken in the first and second horizontal planes PH1, PH2, respectively. The upper clamping portions UC1, UC2, UC3, UC4 may be circumferentially spaced apart from one another in the first horizontal plane PH1, while the lower clamping portions LC1, LC2, LC3, LC4 may be circumferentially spaced apart from one another in the second horizontal plane PH2.

In other embodiments of the present invention (not shown), each of the upper and each of the lower clamping portions may appear as single points on separate upper and lower straight lines, respectively.

In some embodiments of the present invention, as shown in FIGS. 10, 11, 21 and 22, the upper and lower curved lines 58, 60 may be inwardly concave, each having a radius of curvature R1, R2 centered about the central axis A1.

In other embodiments of the present invention (not shown), the upper and lower curved lines may be inwardly convex.

In some embodiments of the present invention, the radius of curvature R1, R2 of the upper and lower curved lines 58, 60 may be greater than the radii of inscribed circles R3, R4 at cross-sections of the clamping bore 38 taken in the first and second horizontal planes PH1, PH2, respectively.

In some embodiments of the present invention, each of the upper clamping portions UC1, UC2, UC3, UC4 may be adjacent to one of the lower clamping portions LC1, LC2, LC3, LC4.

In the first embodiment of the present invention, as shown in FIGS. 4, 6 and 7, adjacent first upper and first lower clamping portions UC1, LC1 may be generally diametrically opposite adjacent third upper and third lower clamping portions UC3, LC3, respectively, and adjacent second upper and second lower clamping portions UC2, LC2 may be generally diametrically opposite adjacent fourth upper and fourth lower clamping portions UC4, LC4, respectively.

In the second embodiment of the present invention, as shown in FIGS. 15, 17 and 18, adjacent first upper and third lower clamping portions UC1, LC3 may be generally diametrically opposite adjacent third upper and first lower clamping portions UC3, LC1, respectively, and adjacent second upper and fourth lower clamping portions UC2, LC4 may be generally diametrically opposite adjacent fourth upper and second lower clamping portions UC4, LC2, respectively.

According to the present invention, as shown in FIGS. 6, 7, 17 and 18, upper imaginary lines LU1, LU2 tangential to the at least two upper clamping portions UC1, UC2 and coplanar with the central axis A1, form zero or acute first clamping angles $\alpha 1$ with the central axis A1, and lower imaginary lines LL1, LL2 tangential to the at least two lower clamping portions LC1, LC2 and coplanar with the central axis A1, form zero or acute second clamping angles $\alpha 2$ with the central axis A1.

The first and second clamping angles $\alpha 1$, $\alpha 2$ may be different, and the upper and lower imaginary lines LU1, LU2, LL1, LL2 associated with the top surface 32 may extend in a direction above the top surface 32 without intersecting the central axis A1.

Each of the at least two upper clamping portions UC1, UC2 and each of the at least two lower clamping portions LC1, LC2 may be visible in a top view of the cutting insert 26, 126, as shown in FIGS. 4 and 15.

In some embodiments of the present invention, the first clamping angle α1 may be greater than the second clamping angle α2.

In some embodiments of the present invention, as shown in FIGS. 5 to 7 and 16 to 18, first and third upper and lower imaginary lines LU1, LL1, LU3, LL3 associated with the first and third upper and lower clamping portions UC1, LC1, UC3, LC3, respectively, may be contained within a first vertical plane PV1, and second and fourth upper and lower imaginary lines LU2, LL2, LU4, LL4 associated with the second and fourth upper and lower clamping portions UC2, LC2, UC4, LC4, respectively, may be contained within a second vertical plane PV2.

Also, in some embodiments of the present invention, the first vertical plane PV1 may be perpendicular to the second vertical plane PV2, and the first and second vertical planes PV1, PV2 may contain the central axis A1.

In some embodiments of the present invention, as shown in FIGS. 5 to 7 and 16 to 18, the cutting insert 26, 126 may be oriented on its respective seating surface 24 such that only the first and second upper clamping portions UC1, UC2 and the first and second lower clamping portions LC1, LC2 are operative. It should be appreciated that in this configuration, there are no other points or regions of clamping contact between the clamping bore 38 and the clamping screw 44. Thus, only two spaced apart but circumferentially adjacent upper clamping portions and only two corresponding spaced apart but circumferentially adjacent lower clamping portions may be operative in any seated orientation of the cutting insert 26, 126.

It can be readily understood that by indexing the cutting insert 26, 126 180° about its central axis A1, only the third and fourth upper clamping portions UC3, UC4 and the third and fourth lower clamping portions LC3, LC4 would become operative.

In some embodiments of the present invention, it can be appreciated that the clamping portions UC1, UC2, UC3, UC4, LC1, LC2, LC3, LC4 are optimally configured on the clamping bore 38, such that each clamping portion UC1, UC2, UC3, UC4, LC1, LC2, LC3, LC4 may be utilized in two index positions of the cutting insert 26, 126, a first of the two index positions for a given clamping portion being rotated 90° about the central axis A1 from a second of the two index positions for that clamping portion. It will further be understood that in each indexing position there are two circumferentially spaced apart operative upper clamping portions and two circumferentially spaced apart operative lower clamping portions, the operative upper clamping portions being axially spaced apart along the central axis A1 from their corresponding operative lower clamping portions.

In some embodiments of the present invention, the four operative clamping portions UC1, UC2, LC1, LC2 may exhibit mirror symmetry about a third vertical plane PV3 bisecting the first and second vertical planes PV1, PV2.

Also, in some embodiments of the present invention, the third vertical plane PV3 may form an acute angle of up to 45° with the first and second vertical planes PV1, PV2.

In the first embodiment of the present invention, the four operative clamping portions UC1, UC2, LC1, LC2 may be entirely situated on one side of a fourth vertical plane PV4, the fourth vertical plane PV4 being perpendicular to the third vertical plane PV3.

In some embodiments of the present invention, each flank surface 40 may have a single planar abutment portion 62.

In other embodiments of the present invention (not shown), each flank surface may have more than one planar or non-planar abutment portion.

In some embodiments of the present invention, as shown in FIGS. 4 and 15, the flank surfaces 40 may be configured with a first flank surface 40a generally opposite a third flank surface 40c, and a second flank surface 40b generally opposite a fourth flank surface 40d. As shown in FIGS. 5, 8, 9, 16, 19 and 20, first and third abutment planes PA1, PA3 tangential to the single abutment portion 62 on each of the first and third flank surfaces 40a, 40c, respectively, may be perpendicular to the third vertical plane PV3, and second and fourth abutment planes PA2, PA4 tangential to the single abutment portion 62 on each of the second and fourth flank surfaces 40b, 40d, respectively, may be perpendicular to the fourth vertical plane PV4. Thus, first and third abutment planes PA1, PA3 may be symmetric about vertical plane PV4 while second and fourth abutment planes PA2, PA4 may be symmetric about vertical plane PV3.

In some embodiments of the present invention, as shown in FIGS. 5, 8, 16 and 19, the cutting insert 26, 126 may be oriented on its respective seating surface 24 such that only the single abutment portion 62 associated with the first flank surface 40a is in abutting contact with a support surface 64 on the tool body 22, and considered operative. It should be appreciated that in this configuration, there are no other points or regions of abutting contact between the peripheral side surface 36 and the cutting body 22. Also, at this index position, due to the inclination of the screw axis A2 with respect to the central axis A1, the screw axis A2 may intersect the first abutment plane PA1 at a point below the insert seating surface 24.

It can be readily understood that by indexing the cutting insert 26, 126 180° about its central axis A1, only the single abutment portion 62 associated with the third flank surface 40c would become operative.

Figure 5:
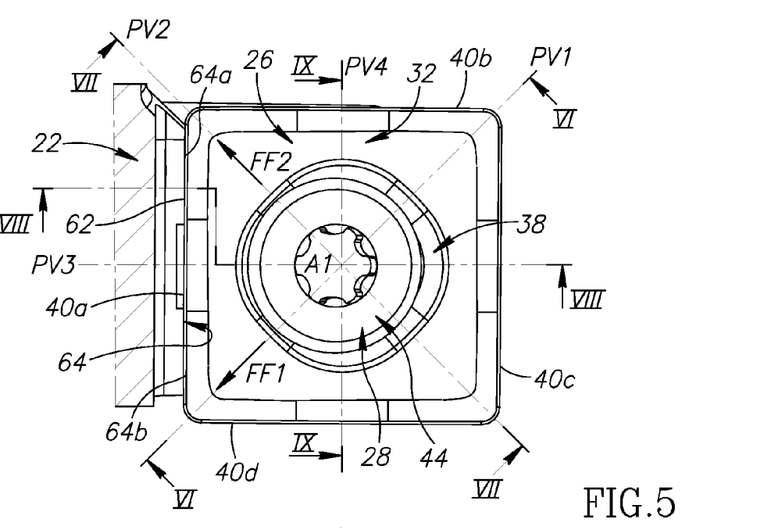
FIG. 5 is a partial view of the cutting tool shown in FIG. 1.
Figure 16:
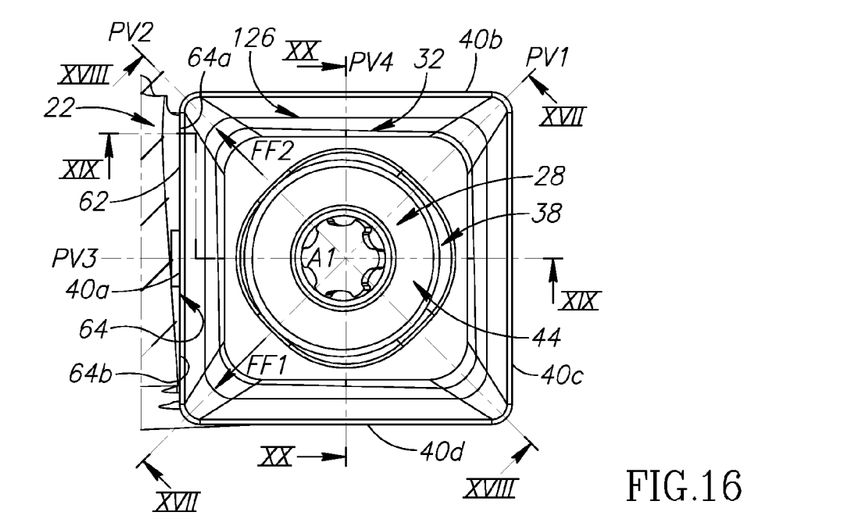
FIG. 16 is a partial view of the cutting tool shown in FIG. 12.

In some embodiments of the present invention, as shown in FIGS. 5 and 16, the support surface 64 may be divided into more than one support zone 64a, 64b.

In some embodiments of the present invention, as shown in FIGS. 6, 7, 17 and 18, the clamping screw 44 may simultaneously apply four clamping forces FU1, FU2, FL1, FL2 at the four operative clamping portions UC1, UC2, LC1, LC2, comprising a first upper and lower clamping force FU1, FL1 at the first upper and lower clamping portions UC1, LC1, respectively, and a second upper and lower clamping force FU2, FL2 at the first upper and lower clamping portions UC2, LC2, respectively.

Also, in some embodiments of the present invention, as shown in FIGS. 5 to 7 and 16 to 18, the first upper and lower clamping forces FU1, FL1 may sum to a first final clamping force FF1 as a single vector within the first vertical plane PV1, and the second upper and lower clamping forces FU2, FL2 may sum to a second final clamping force FF2 as a single vector within the second vertical plane PV2. The first and second final clamping forces FF1, FF2 may be substantially identical in magnitude, and the vectors associated with the first and second final clamping forces FF1, FF2 may be inclined at similar acute angles to the substantially planar insert seating surface 24 and intersect the first abutment plane PA1 at points outboard of the support surface 64.

The present invention is advantageous in that the four simultaneous clamping forces FU1, FU2, FL1, FL2 have a high degree of repeatability, and the two final clamping forces FF1, FF2 provide optimal stability and precise positioning of the cutting insert 26, 126 for applications where only a single flank surface 40 is operative.

In some embodiments of the present invention, as shown in FIGS. 1, 5, 8, 12, 16 and 19, the cutting tool 20, 120 may be in the form of a rotary cutting tool having a longitudinal axis of rotation A3, and only the single abutment portion 62 associated with the first flank surface 40a may be operative and in abutting contact with a radially outward facing support surface 64. Here, the cutting edge 42 associated with the third flank surface 40c may be operative.

In some embodiments of the present invention, the cutting tool 20, 120 may be in the form of a face or slot milling tool, where the cutting insert 26, 126 is subjected to both radial and axial directed cutting forces. The present invention may be advantageous in that radial and axial support for the cutting insert 26, 126 is provided by the radially outward facing support surface 64 and the clamping screw 44, eliminating the need for the tool body 22 to have an axial support surface, and enabling the slot milling tool, for example, to produce slots having a reduced slot width relative to the cutting width of the cutting insert 26, 126.

Although the present invention has been described to a certain degree of particularity, it should be understood that various alterations and modifications could be made without departing from the spirit or scope of the invention as hereinafter claimed.

What is claimed is:

1. A cutting tool (20, 120) comprising a tool body (22) with at least one seating surface (24), at least one cutting insert (26, 126), and at least one fastening member (28) for removably securing the at least one cutting insert (26, 126) to the at least one seating surface (24),
   the at least one cutting insert (26, 126) having opposing top and bottom surfaces (32, 34) with a peripheral side surface (36) and a central axis (A1) extending therebetween, and a clamping bore (38) in the top surface (32),
   the peripheral side surface (36) including at least one flank surface (40), where at least one cutting edge (42) is formed at the intersection of the at least one flank surface (40) with at least the top surface (32), and
   the clamping bore (38) including at least two upper clamping portions (UC1, UC2) intersecting a first horizontal plane (PH1) and at least two lower clamping portions (LC1, LC2) intersecting a second horizontal plane (PH2), each of the clamping portions (UC1, UC2, LC1, LC2) representing a distinct region of the clamping bore (38), and the first and second horizontal planes (PH1, PH2) being perpendicular to the central axis (A1) and spaced apart from each other,
   wherein upper imaginary lines (LU1, LU2) tangential to the at least two upper clamping portions (UC1, UC2) and coplanar with the central axis (A1), form zero or acute first clamping angles (α1) with the central axis (A1), and lower imaginary lines (LL1, LL2) tangential to the at least two lower clamping portions (LC1, LC2) and coplanar with the central axis (A1), form zero or acute second clamping angles (α2) with the central axis (A1),
   wherein the first and second clamping angles (α1, α2) are different, and
   wherein exactly two upper clamping portions (UC1, UC2) and exactly two lower clamping portions (LC1, LC2), representing four operative clamping portions (UC1, UC2, LC1, LC2), are in simultaneous clamping contact with an equal number of corresponding clamping zones (UZ1, UZ2, LZ1, LZ2) on the fastening member (28).

2. The cutting tool (20, 120) according to claim 1, wherein the first horizontal plane (PH1) bisects the at least two upper clamping portions (UC1, UC2) and the second horizontal plane (PH2) bisects the at least two lower clamping portions (LC1, LC2).

3. The cutting tool (20, 120) according to claim 1, wherein the first horizontal plane (PH1) is closer to the top surface (32) than the second horizontal plane (PH2), and the first clamping angle (α1) is greater than the second clamping angle (α2).

4. The cutting tool (20, 120) according to claim 1, wherein the upper and lower imaginary lines (LU1, LU2, LL1, LL2) associated with the four operative clamping portions (UC1, UC2, LC1, LC2) extend in a direction above the top surface (32) without intersecting the central axis (A1).

5. The cutting tool (20, 120) according to claim 1, wherein upper and lower imaginary lines (LU1, LL1) associated with two of the four operative clamping portions (UC1, LC1), are contained within a first vertical plane (PV1), and upper and lower imaginary lines (LU2, LL2) associated with two other of the four operative clamping portions (UC2, LC2) are contained within a second vertical plane (PV2).

6. The cutting tool (20, 120) according to claim 5, wherein the first vertical plane (PV1) is perpendicular to the second vertical plane (PV2), and
   wherein the first and second vertical planes (PV1, PV2) contain the central axis (A1).

7. The cutting tool (20, 120) according to claim 5, wherein each of the at least one flank surface (40) includes at least one abutment portion (62), and
   wherein only the at least one abutment portion (62) associated with a single flank surface (40) is operative and in abutting contact with a corresponding support surface (64) on the tool body (22).

8. The cutting tool (20, 120) according to claim 7, wherein the cutting tool (20, 120) has a longitudinal axis of rotation (A3), and
   wherein the at least one abutment portion (62) associated with the single operative flank surface (40) is in abutting contact with a radially outward facing support surface (64) of the tool body (22).

9. The cutting tool (20, 120) according to claim 7, wherein the at least one abutment portion (62) is planar.

10. The cutting tool (20, 120) according to claim 7, wherein a third vertical plane (PV3) containing the central axis (A1) bisects the first and second vertical planes (PV1, PV2), and
    wherein an abutment plane (PA1) tangential to the at least one abutment portion (62) associated with the single operative flank surface (40) is perpendicular to the third vertical plane (PV3).

11. The cutting tool (20) according to claim 10, wherein the four operative clamping portions (UC1, UC2, LC1, LC2) are entirely situated on one side of a fourth vertical plane (PV4), the fourth vertical plane (PV4) containing the central axis (A1) and being perpendicular to the third vertical plane (PV3).

12. The cutting tool (20, 120) according to claim 10, wherein the four operative clamping portions (UC1, UC2, LC1, LC2) exhibit mirror symmetry about the third vertical plane (PV3).

13. The cutting tool (20, 120) according to claim 1, wherein the clamping bore (38) extends towards and opens out at the bottom surface (34), and is non-circular at cross-sections taken in the first and second horizontal planes (PH1, PH2), and wherein the fastening member (28) is in the form of a clamping screw (44) having a screw axis (A2).

14. The cutting tool (20, 120) according to claim 13, wherein each of the at least two upper clamping portions (UC1, UC2) and each of the at least two lower clamping portions (LC1, LC2) appear as single segments of separate upper and lower curved lines (58, 60) at cross-sections taken in the first and second horizontal planes (PH1, PH2), respectively.

15. The cutting tool (20, 120) according to claim 14, wherein the upper and lower curved lines (58, 60) each has a radius of curvature (R1, R2) centered about the central axis (A1).

16. The cutting tool (20, 120) according to claim 15, wherein the radius of curvature (R1, R2) of each of the upper and lower curved lines (58, 60) is greater than a corresponding radius of an inscribed circle (R3, R4) at a cross-section of the clamping bore (38) taken in the first and second horizontal planes (PH1, PH2), respectively.

17. The cutting tool (20, 120) according to claim 13, wherein the clamping screw (44) comprises a threaded portion (46) and a non-threaded portion (48), the non-threaded portion (48) including the four clamping zones (UZ1, UZ2, LZ1, LZ2) and the threaded portion (46) engaging a threaded bore (50) in the at least one seating surface (24), and
wherein the screw axis (A2) is inclined with respect to the central axis (A1).

18. The cutting tool (20, 120) according to claim 17, wherein the non-threaded portion (48) is circular at any cross-section taken in a plane perpendicular to the screw axis (A2), having a first screw sub-portion (52) with a constant first diameter (D1), and a second screw sub-portion (54) with a second diameter (D2) which increases in a direction away from the threaded portion (46).

19. The cutting tool (20, 120) according to claim 1, wherein the at least one cutting insert (26, 126) is indexable about its central axis (A1), having four flank surfaces (40), four cutting edges (42) formed at the intersection of the four flank surfaces (40) with the top surface (32), four upper clamping portions (UC1, UC2, UC3, UC4), and four lower clamping portions (LC1, LC2, LC3, LC4).

20. The cutting tool (120) according to claim 1, wherein the clamping bore (38) exhibits mirror symmetry about a median plane (M) perpendicular to the central axis (A1), and
wherein at least one cutting edge (42) is formed at the intersection of the at least one flank surface (40) with the bottom surface (34).

21. The cutting tool (120) according to claim 20, wherein the first and second horizontal planes (PH1, PH2) are situated between the top surface (32) and the median plane (M).

22. The cutting tool (120) according to claim 20, wherein the at least one cutting insert (126) has four flank surfaces (40) and eight cutting edges (42), four cutting edges (42) formed at the intersection of the four flank surfaces (40) with the top surface (32), and four cutting edges (42) formed at the intersection of the four flank surfaces (40) with the bottom surface (34).

23. A cutting insert (26, 126) having opposing top and bottom surfaces (32, 34) with a peripheral side surface (36) and a central axis (A1) extending therebetween, and a clamping bore (38) in the top surface (32),
the peripheral side surface (36) including at least one flank surface (40), and at least one cutting edge (42) formed at the intersection of the at least one flank surface (40) with at least the top surface (32), and
the clamping bore (38) including at least two upper clamping portions (UC1, UC2) intersecting a first horizontal plane (PH1), and at least two lower clamping portions (LC1, LC2) intersecting a second horizontal plane (PH2), each of the clamping portions (UC1, UC2, LC1, LC2) representing a distinct region of the clamping bore (38), and the first and second horizontal planes (PH1, PH2) being perpendicular to the central axis (A1) and spaced apart from each other,
wherein upper imaginary lines (LU1, LU2) tangential to the at least two upper clamping portions (UC1, UC2) and coplanar with the central axis (A1), form zero or acute first clamping angles ($\alpha1$) with the central axis (A1), and lower imaginary lines (LL1, LL2) tangential to the at least two lower clamping portions (LC1, LC2) and coplanar with the central axis (A1), form zero or acute second clamping angles ($\alpha2$) with the central axis (A1),
wherein the first and second clamping angles ($\alpha1$, $\alpha2$) are different,
wherein the clamping bore (38) extends towards and opens out at the bottom surface (34), and is non-circular at cross-sections taken in the first and second horizontal planes (PH1, PH2), and
wherein the upper and lower imaginary lines (LU1, LU2, LL1, LL2) extend in a direction above the top surface (32) without intersecting the central axis (A1).

24. The cutting insert (26, 126) according to claim 23, wherein the first horizontal plane (PH1) bisects the at least two upper clamping portions (UC1, UC2) and the second horizontal plane (PH2) bisects the at least two lower clamping portions (LC1, LC2).

25. The cutting insert (26, 126) according to claim 23, wherein the first horizontal plane (PH1) is closer to the top surface (32) than the second horizontal plane (PH2), and the first clamping angle ($\alpha1$) is greater than the clamping second angle ($\alpha2$).

26. The cutting insert (26, 126) according to claim 23, wherein each of the at least two upper clamping portions (UC1, UC2) and each of the at least two lower clamping portions (LC1, LC2) appear as single segments of separate upper and lower curved lines (58, 60) at cross-sections taken in the first and second horizontal planes (PH1, PH2), respectively.

27. The cutting insert (26, 126) according to claim 26, wherein the upper and lower curved lines (58, 60) each has a radius of curvature (R1, R2) centered about the central axis (A1).

28. The cutting insert (26, 126) according to claim 27, wherein the radius of curvature (R1, R2) of each of the upper and lower curved lines (58, 60) is greater than a corresponding radius of curvature of an inscribed circle (R3, R4) at a cross-section of the clamping bore (38) taken in the first and second horizontal planes (PH1, PH2), respectively.

29. The cutting insert (26, 126) according to claim 23, wherein the cutting insert (26, 126) is indexable about its central axis (A1), having four flank surfaces (40), four cutting edges (42) formed at the intersection of the four flank surfaces (40) with the top surface (32), four upper clamping portions (UC1, UC2, UC3, UC4), and four lower clamping portions (LC1, LC2, LC3, LC4).

30. The cutting insert (26, 126) according to claim 29, wherein first and third upper and lower imaginary lines (LU1, LL1, LU3, LL3) associated with a first and third of the four upper and lower clamping portions (UC1, LC1, UC3, LC3) are contained within a first vertical plane (PV1), and second and fourth upper and lower imaginary lines (LU2, LL2, LU4, LL4) associated with a second and fourth of the four upper and lower clamping portions (UC2, LC2, UC4, LC4) are contained within a second vertical plane (PV2).

31. The cutting insert (26, 126) according to claim 30, wherein the first vertical plane (PV1) is perpendicular to the second vertical plane (PV2), and
wherein the first and second vertical planes (PV1, PV2) contain the central axis (A1).

32. The cutting insert (26, 126) according to claim 30, wherein each of the four flank surfaces (40) include at least one abutment portion (62), and
wherein first and third abutment planes (PA1, PA3) tangential to one of the at least one abutment portion (62) on a first and third flank surface (40a, 40c), respectively, are perpendicular to a third vertical plane (PV3), and second and fourth abutment planes (PA2, PA4) tangential to one of the at least one abutment portion (62) on a second and fourth flank surface (40b, 40d), respectively, are perpendicular to a fourth vertical plane (PV4), and
wherein the third vertical plane (PV3) bisects the first and second vertical planes (PV1, PV2), and the fourth vertical plane (PV4) is perpendicular to the third vertical plane (PV3).

33. The cutting insert (126) according to claim 23, wherein the clamping bore (38) exhibits mirror symmetry about a median plane (M) perpendicular to the central axis (A1), and
wherein at least one cutting edge (42) is formed at the intersection of the at least one flank surface (40) with the bottom surface (34).

34. The cutting insert (126) according to claim 33, wherein the first and second horizontal planes (PH1, PH2) are situated between the top surface (32) and the median plane (M).

35. A cutting insert (26, 126) having opposing top and bottom surfaces (32, 34) with a peripheral side surface (36) and a central axis (A1) extending therebetween, and a clamping bore (38) in the top surface (32) which extends to the bottom surface (34),
the peripheral side surface (36) including at least one flank surface (40), and at least one cutting edge (42) formed at the intersection of the at least one flank surface (40) with at least the top surface (32), and
the clamping bore (38) including at least two upper clamping portions (UC1, UC2) intersecting a first horizontal plane (PH1), and at least two lower clamping portions (LC1, LC2) intersecting a second horizontal plane (PH2), each of the clamping portions (UC1, UC2, LC1, LC2) representing a distinct region of the clamping bore (38), and the first and second horizontal planes (PH1, PH2) being perpendicular to the central axis (A1) and spaced apart from each other,
wherein the clamping bore (38) opens out to the bottom surface (34) and is non-circular at cross-sections taken in the first and second horizontal planes (PH1, PH2),
wherein the at least two upper clamping portions (UC1, UC2) and the at least two lower clamping portions (LC1, LC2) are symmetric about a vertical plane (PV3) which contains the central axis (A1) and is perpendicular to the at least one flank surface (40), and
wherein the at least two upper clamping portions (UC1, UC2) and the at least two lower clamping portions (LC1, LC2) are visible within the clamping bore (38) in a top view of the insert along the insert central axis (A1).

36. The cutting insert (26, 126) according to claim 35, wherein upper imaginary lines (LU1, LU2) tangential to the at least two upper clamping portions (UC1, UC2) and coplanar with the central axis (A1), form acute first clamping angles ($\alpha 1$) with the central axis (A1), and lower imaginary lines (LL1, LL2) tangential to the at least two lower clamping portions (LC1, LC2) and coplanar with the central axis (A1), form acute second clamping angles ($\alpha 2$) with the central axis (A1), and
wherein the first and second clamping angles ($\alpha 1$, $\alpha 2$) are different.

37. The cutting insert (26, 126) according to claim 35, wherein:
the cutting insert is indexable about the central axis (A1) and
in each indexing position, there are two circumferentially spaced apart operative upper clamping portions and two circumferentially spaced apart operative lower clamping portions, the operative upper clamping portions being axially spaced apart along the central axis (A1) from their corresponding operative lower clamping portions.

38. The cutting insert (26, 126) according to claim 35, wherein the clamping bore (38) exhibits mirror symmetry about a median plane (M) perpendicular to the central axis (A1), and
wherein at least one cutting edge (42) is formed at the intersection of the at least one flank surface (40) with the bottom surface (34).

* * * * *